DE FOREST C. WILLIAMS & W. M. UPDEGRAVE.
COIN CONTROLLED SCALE.
APPLICATION FILED JUNE 16, 1913.

1,171,912.
Patented Feb. 15, 1916.
6 SHEETS—SHEET 4.

WITNESSES:
M. P. McKee
R. Kislink

INVENTORS
D. C. Williams and
W. M. Updegrave
Alex. J. Wedderburn, Jr.
ATTORNEY

UNITED STATES PATENT OFFICE.

DE FOREST CURTIS WILLIAMS, OF PITTSBURGH, AND WILLIAM MARSH UPDEGRAVE, OF JOHNSTOWN, PENNSYLVANIA.

COIN-CONTROLLED SCALE.

1,171,912.  Specification of Letters Patent.  Patented Feb. 15, 1916.

Application filed June 16, 1913.  Serial No. 774,057.

*To all whom it may concern:*

Be it known that we, DE FOREST CURTIS WILLIAMS and WILLIAM M. UPDEGRAVE, citizens of the United States, DE FOREST CURTIS WILLIAMS residing at Pittsburgh, in the county of Allegheny and State of Pennsylvania, and WILLIAM M. UPDEGRAVE residing at Johnstown, in the county of Cambria and State of Pennsylvania, have invented certain new and useful Improvements in Coin-Controlled Scales, of which the following is a specification.

This invention relates to improvements in coin controlled scales and has for its object to provide a weighing machine so constructed as to make its operation very simple while assuring absolutely correct work.

Another object of the invention is to provide mechanical means for shifting a poise on a scale beam whereby the poise and its shifting mechanism will become automatically detached from one another.

Another object of the invention is to provide a scale with a vertically movable shutter for the beam of said scale.

Another object of the invention is to provide means for operating a poise shifter and means for disconnecting said shifter with said first means.

With the above and other objects in view, all of which will be more specifically described in the following specification, we have invented the device illustrated in the accompanying drawings in which—

Figures 1, 2:
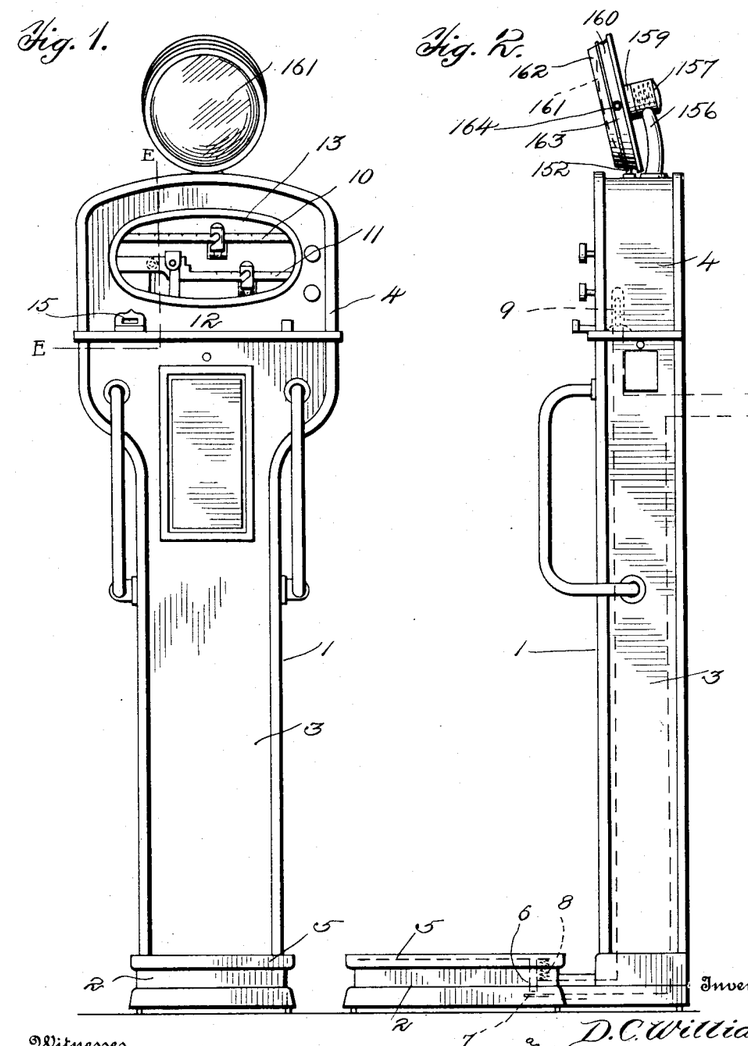
Figure 1 is a front elevation of our improved scales.
Fig. 2 is a side elevation thereof.
Figures 3, 4:
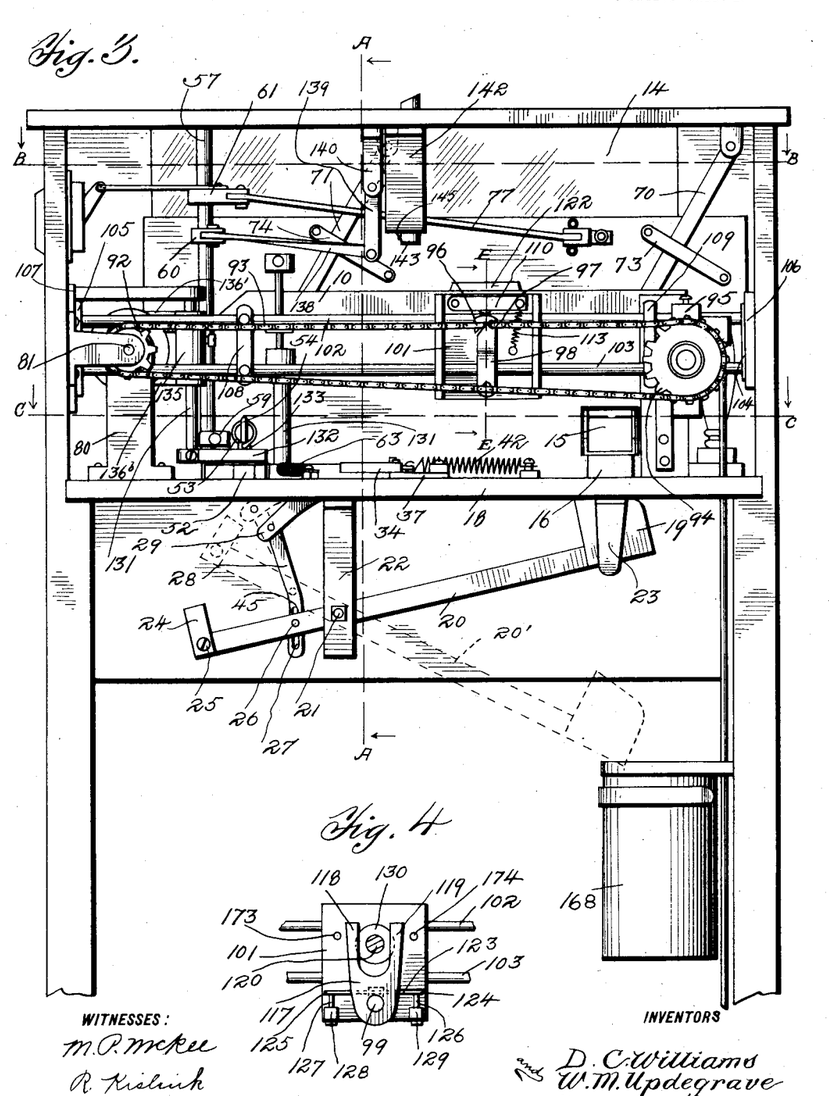
Fig. 3 is a rear elevational view of the upper part of our invention with the rear wall of the casing removed.
Fig. 4 is a detail elevational view of the poise shifting device.
Figures 9, 10:
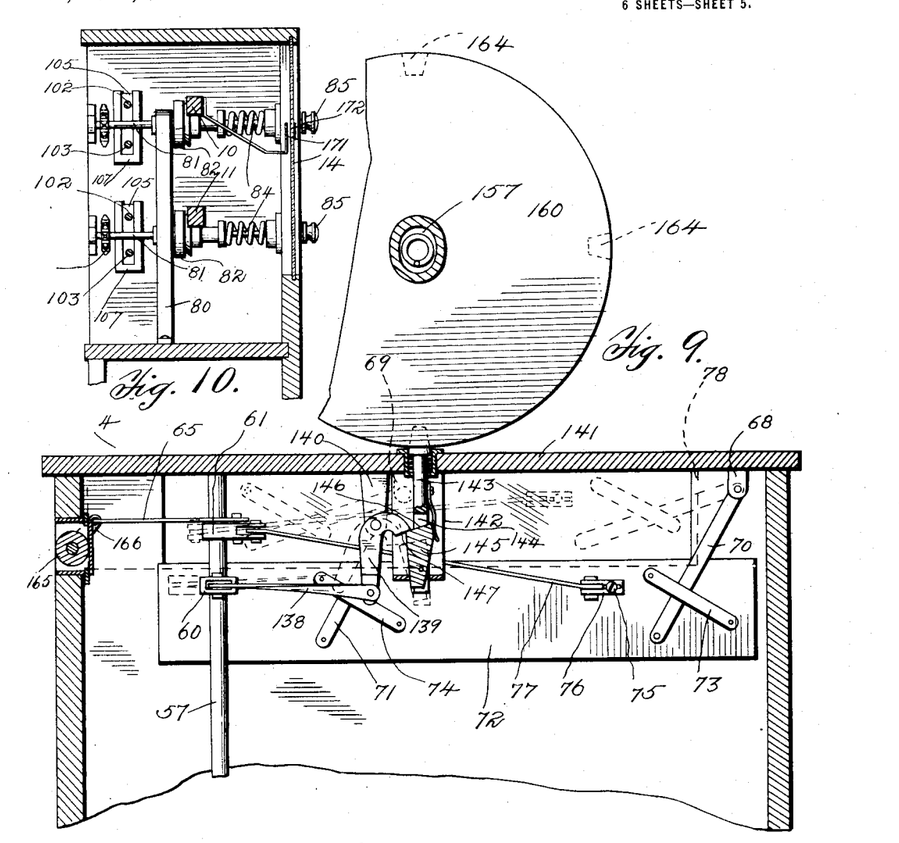
Fig. 9 is a section taken on line D—D of Fig. 5.
Fig. 10 is a vertical section taken on line E—E of Fig. 1, certain parts of the mechanism being removed.
Figures 11, 12, 13:
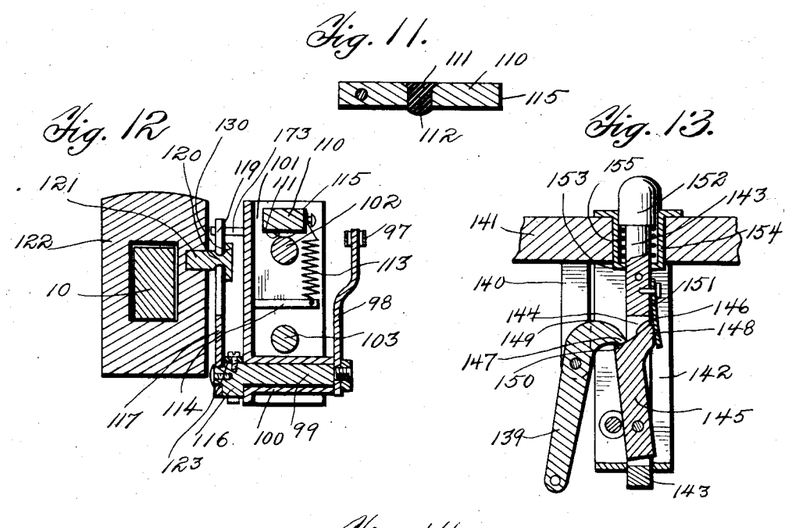
Fig. 11 is a detailed sectional view of a friction device.
Fig. 12 is a detail sectional view taken on line E—E of Fig. 3.
Fig. 13 is an enlarged detail sectional view of a locking mechanism.
Figure 14:
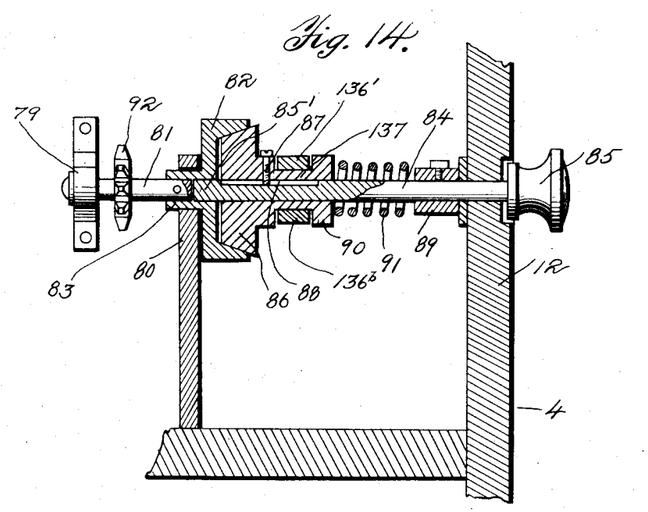
Fig. 14 is an enlarged sectional view of a friction clutch device.

It will be noted by comparing Figs. 1 and 3 that we illustrate our device to show its operation with either a one or two beam scale but most commonly it would be used with the two beam scale, however, in order not to complicate the drawings, in all of the views with the exception of Figs. 1 and 10, a one beam scale is illustrated. The poise operating mechanism in either a one or two beam scale would be the same.

Like reference characters indicate like parts throughout the specification and in the various views in the drawings.

1 indicates our improved coin controlled scale having a platform stand 2, a casing 3, and an upper case 4. Mounted on the stand 2 is a platform 5 which is provided at its forward end with an electrical contact point 6 held normally above the contact 7 by means of the spring 8. When a weight is placed upon the platform 2 the spring 8 is overcome and the member 6 engages the member 7 closing an electrical circuit thereby providing current for the lamp 9 within the case 4 whereby light is provided in order that the figures on the scale beams 10 and 11 may readily be seen by a person standing on the platform 5. All of the electrical connections, the spring 8 and lamp 9 above described are shown in dotted lines in Fig. 2.

The face 12 of the case 4 is provided with an opening 13 in which the glass 14 is mounted in order that the scale beams may be exposed to view. A coin receiving slot 15 is provided in said face 12 which is connected to the chute 16, which is adapted to direct a coin through the slot 17 in the bottom wall 18 in the case 4, into the receptacle 19 on one end of the balance arm 20 which is fulcrumed and pivotally mounted on the pin 21 secured to the bearing 22 fixed to the under side of said wall 18. A guide member 23 is provided to guide the receptacle 19 to the slot 17. On the opposing end of the arm 20 is a weight 24 which is adjustable on said arm by means of the screw 25, whereby said arm 20 may be nicely balanced in order that it may be operated with a coin of any desired weight. A pin 26 is provided on said arm 20 which is slidable in the slot 27 in the link 28, the upper end of which is pivotally connected to the lower end 29 of the trip 30 which is pivotally mounted in the slot 31 in said wall 18, the free end of said trip being provided with a hook 32 normally held raised by the spring 32'. Said hook 32 is adapted to engage the end 33 of the crank lever 34 which is pivoted at 35 on the free end 36 of the radially pivoted adjusting member 37, the end 38 of which is provided with an arcuate slot 39 through which projects the thumb screw 40. By loosening this screw the member 37 may be rotated in either direction on the pin 41 in order that the fulcrum 35 of said crank lever 34 may be nicely adjusted to a proper position. A spring 42 has one end connected to the arm 43 of said crank and another end connected to the screw 44 fixed in said wall 18 so that when a coin passing through the slot 15 falls into the receptacle 19, it will overbalance the arm 20 causing it to take the position shown in dotted lines 20' in Fig. 3, in which case the pin 26 will engage the edge 45 of said slot 27 forcing the link 28 and the end 29 of the trip 30 to move up into said slot 31 and free the hook 32 from the said arm 43, thus permitting the spring 42 to draw said arm toward said screw 44 causing the end 47 of the arm 48 of said crank 34 to engage the lever 49, shifting its position so that the dog 50 thereon will disengage from the recesss 51 in the plunger rod 52, thus permitting the spring 53 fixed to the pin 54 on the inner end of said rod and to the eye 55 secured to the inner surface of the face 12 to thrust the forward end 52' of said plunger outwardly through an opening 56 (shown in dotted lines in Fig. 5), said lever 49 being held in the normal position by means of the spring 62, whereby said dog 50 is held into one of the recesses 51. Mounted pivotally in the case 4 is a vertical rod 57 upon which is fixed a series of levers 58, 59, 60 and 61. The lowermost of these levers, which is lever 58, has its free end seated over the plunger rod 52, whereby the roller 63 will engage one edge of lever 58 so that when the plunger rod 52 is pushed inwardly by manual engagement with the plunger head 64, said roller will actuate said lever 58 and cause it to rotate said rod 57. To the lower surface of the lever 59 is pivoted one end of a link 65 in the other end of which is provided an elongated slot 66 through which the pin 67 on the arm 43 passes, whereby said link 65 is loosely connected to said arm 43 and has a free movement on said arm.

Pivotally mounted to the bearings 68—69 (the latter shown dotted in Fig. 9) are vertically radially movable hangers 70—71, the lower ends of which are pivoted to the vertically movable shutter 72, said hangers 70 and 71 being flat and held in position by the straps 73 and 74 between which and said shutter said hangers are movable. Connected to the pin 75 on said shutter is a loose joint member 76 to which is pivoted one end of the link 77, the other end of which is pivoted to the lever 61 fixed to said shaft 57. When the plunger 52 is pushed inwardly of said case the roller 63 operates the lever 58 which in turn rotates the vertical rod 57 causing the lever 61 to have a radial movement which draws the link 77, which pulls the shutter 72 toward said rod 57 thereby causing the shutter to be drawn to a raised position as shown in dotted lines 78 in Fig. 9, thereby exposing the scale beam 10 to view.

Figure 15:
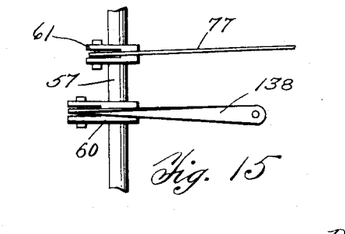
Fig. 15 is a detail elevational view of a shaft and lever shown in a rotated position.

Normally the shutter 72 is held in a raised position and is held in its raised position by the lever 61 drawing on the link 77. The lever 61 is held in its position shown in Fig. 15 whereby it draws upon said link 77 by the rotated position of the rod 57 which is held in said rotated position as before explained when said plunger member 52 is pushed inwardly of said casing and held to its position by said dog 50.

Figure 5:
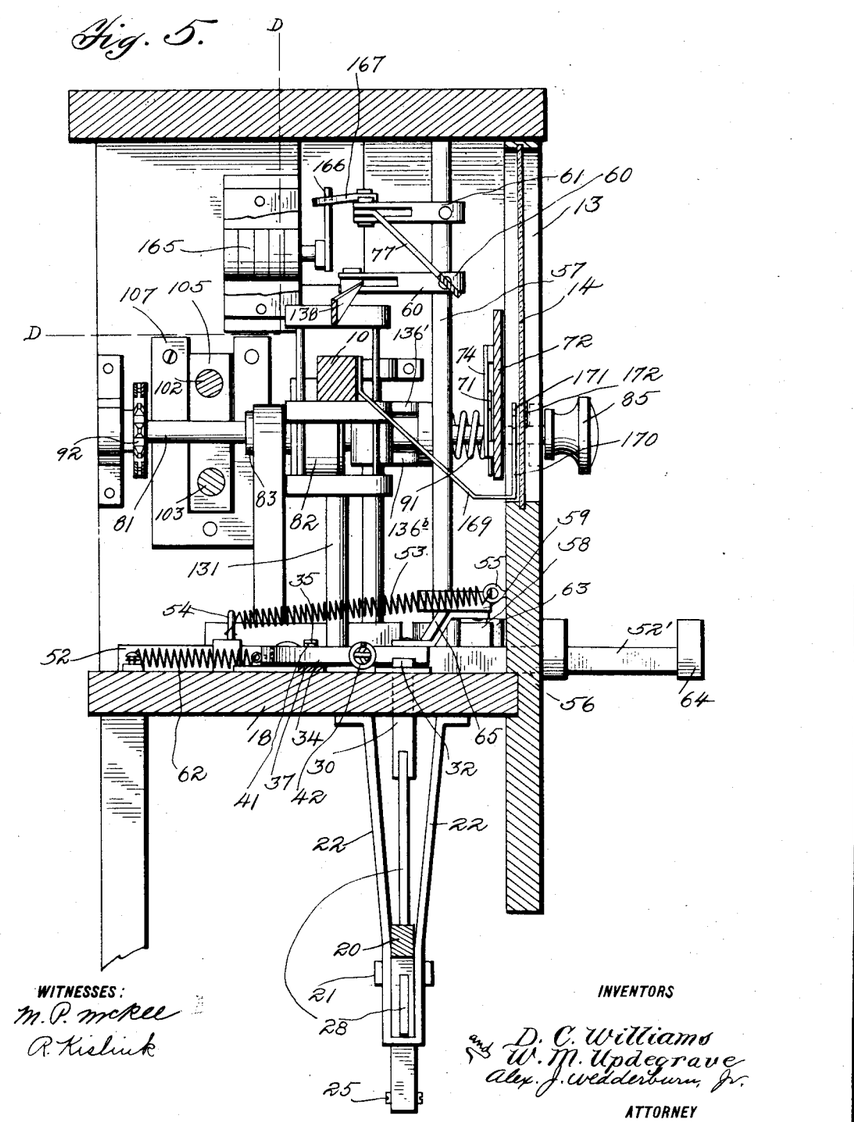
Fig. 5 is an enlarged sectional view on line A—A of Fig. 3.
Figure 6:
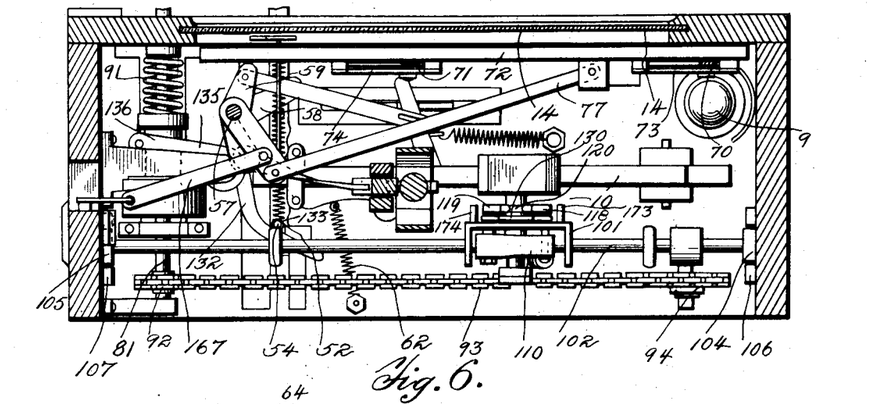
Fig. 6 is a section taken on line B—B of Fig. 3.
Figure 7:
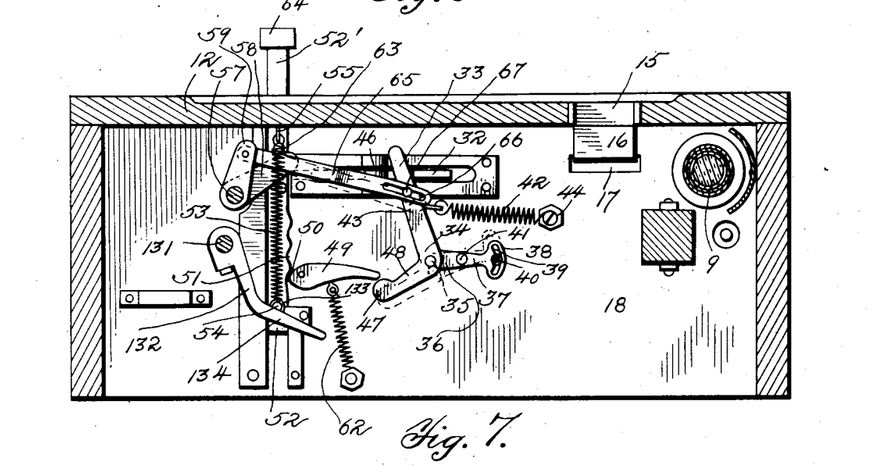
Fig. 7 is a section taken on line C—C of Fig. 3.
Figure 8:
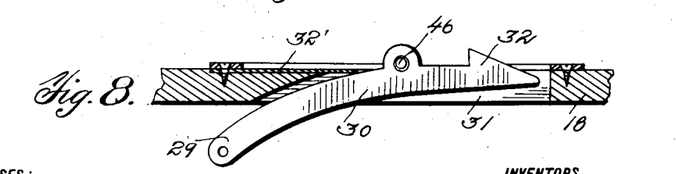
Fig. 8 is an enlarged detail view of a trip member.

When the coin falls into the receptacle 19 causing the arm 20 to over balance, thus disengaging the hook 32 from the arm 43, the spring 42 drawing on said arm causes the end 47 of the arm 48 to trip the lever 49 disengaging the dog 50 from the recess 51 and permitting the spring 53 to force said plunger member 52 outwardly whereby said roller 63 will disengage said lever 58 after which the weight of the shutter 72 will cause it to drop to lowermost position, thereby drawing, through the medium of the link 77, upon the lever 61 fixed to the shaft 57 which turns said shaft to its normal position, shown clearly in Figs. 3, 5 and 9.

Fixed to a clutch member 82 is one end of a shaft 81 the other end of which is mounted in the bearing 79. The clutch member 82 is provided with a bearing portion 83 which is mounted in the bearing 80. Projecting through the face 12 of the case 4 is a rotatable rod 84, the free end 85 of which is freely rotatable in the bearing 83. Mounted near the inner end of said rod 84 is a clutch member 86 adapted to engage said clutch member 82. A screw 87 on the clutch member 86 projects into a kerf 88 on said rod 84, whereby said rod and member 86 are held in rotatable relation with one another. Mounted between the collar 89 on the rod 84 and the end 90 of the clutch member 86 is a coil spring 91 which is adapted to force the clutch member 86 into frictional engagement with the clutch member 82 whereby the rotation of the rod 84 and the member 86 will cause the rotation of the clutch member 82 and the shaft 81. The rod 84 has a head 85 projecting outwardly of the face 12 for the rotation of the member 84.

Fixedly mounted on the shaft 81 is a sprocket wheel 92 which operates the sprocket chain 93 which is supported at the opposing side of said case 4 by a sprocket wheel 94 mounted on the bearing 95. The opposing ends 96 and 97 of said sprocket chain are fixed to the upper end of the lever 98 which is fixedly mounted upon the shaft 99 rotatable in the bearing 100 on the lower end of a sliding member 101 which is slidable upon the parallel horizontal bars 102 and 103, the ends of which are mounted in the links 104 and 105 seated in the sockets 106 and 107. The rods 102 and 103 are held in fixed parallel relation to one another by the links 108 and 109 which are adjustable on said rods and which also act as stops whereby the movement along said rods 102, and 103 of the member 101 may be regulated. Pivotally mounted in the upper end of the member 101 is a friction member 110 in which is fixed a rubber tip 111 the protruding end 112 of which is adapted to engage the upper surface of the rod 102. The spring 113 connected to the pin 114 and to the free end 115 of the member 110 forces the tip 111 into contact with said rod 102 whereby the member 101 will not too freely slide upon the rods 102 and 103.

To the end 116 of the shaft 99 is fixedly secured a bifurcated member 117, the arms 118 and 119 straddle the reduced portion 120 of the pin 121 fixed to the rear surface of the poise 122 mounted on the beam 10. The member 101 is provided with a pair of pins 173 and 174 adapted to control the radial movements of the arms 118 and 119. Fixedly mounted on the upper surface of the end 116 of the shaft 99 is a leaf spring 123 the opposing ends 124 and 125 of which abut the screws 126 and 127 that are threaded through the lugs 128 and 129 on the member 101. The function of this spring 123 is to cause the shaft and the member 117 thereon to maintain a normal position whereby the arms 118 and 119 will normally be held out of contact with the pin 120. The purpose of the member 101 is to slide the poise to any desired position on the scale beam 10, but it is essential in a scale that will maintain any accuracy, that means must be provided whereby the poise operating member instantly may become detached from any contact whatsoever, with the poise, otherwise it would be impossible to correctly balance the scale beam. The pin 121 is provided with a head 130 which is larger than the space between the arms 118 and 119 so that it would be impossible for any horizontal movement of the poise operating member 101 to disconnect the member 117 from said pin 120.

Vertically mounted adjacent the rod 57 is a rotatable rod 131 to the lower end of which is fixed a crank lever 132 which is operated by the roller 133 on the pin 54 mounted on the end of the plunger member 52. When said plunger member is driven in the roller operating on the arm 134 causes the shaft 131 to rotate, thus rotating the lever 135 fixedly mounted on the upper end of the shaft 131. This lever 135 is provided with a bifurcated end 136 which straddles the reduced portion 137 of the clutch member 86, so that when said shaft 131 is rotated the arms 136 and 136' of said bifurcated lever horizontally moves the clutch member 86 on the rod 84 against the tension of the spring 91 and out of contact with the clutch member 82 whereby the head 85 may be freely rotated without in any way acting upon the operation of the machine.

The lever 60 on the shaft 57 is connected to a link 138 connected to the dog 139 which is pivoted to the hanger 140 depending from the top 141 of the case 4. Vertically slidable in the hanger 142 is a bolt 143 having a slot 144 in which is pivoted a trip member 145 having an inclined upper surface 146 which is engaged by the horizontally disposed head 147 of the dog 139. The member 145 has a portion 148 which in its normal position rests within slot 144 but which is adapted to be projected from said slot by the operation of the dog 139. The cam surface 149 of said dog abuts against the rear surface 150 of said trip member, forcing said portion 148 outwardly against the tension of the spring 151, said spring being adapted to push said portion 148 back into the slot when the dog 139 assumes a normal position. The bolt 143 is provided with an enlarged head 152 between which and the lower surface 153 of the socket member 154 is seated a coil spring 155 adapted to normally hold said head projected above the surface of said top 141.

Mounted on the top 141 is a bracket 156 having a chamber 157 to which is fixed one end of a coil spring 158, the other end of said spring being fixed to the member 159 on the rear of the frame 160 in which is seated a bent mirror 161. On the peripheral frame 162 is a groove 163 in which are four recesses 164 at equal distance around said peripheral edge, into which the bolt head 152 is adapted to seat. From the above description it will be seen that a rotary movement of the rod 57 will cause the dog 139 to press the member 145 and with it the bolt 143 downwardly drawing the head 152 out of one of the recesses 164, permitting the rotation of the frame 160 to move one-fourth of its circumference until the head 152 which immediately rises after the disengagement of the dog 139, to seat in the succeeding recess 164, whereby the mirror frame will be held against further movement until another operation of the machine. The spring 158 may be put under tension in order to rotate the mirror frame 160 by lowering the head 152 and revolving the frame. The mirror 160 being bent concave or convex as desired, in one position, will have the effect of broadening whatever it reflects, while in its next position will have the effect of lengthening that which it reflects.

Mounted in the wall of the case 4 or in any suitable position within said case or casing is a numbering machine 165 having a lever 166 attached to the link 167 operated by the lever 61, whereby each operation of the shaft 57 will operate the numbering machine 165 and thus a record will be kept of the number of times the machine is operated and will thus total the amount of coins dropped into the slot, so that each time the coins are removed from the coin receptacle 168 it will be unnecessary to count them, the number being determined by the indicated number on the numbering machine.

On the end of the scale beam 10 is an arm 169 having an upwardly bent portion 170 carrying an arrow head 171 the point of which is adapted to aline with the point of the arrow head 172 painted on the glass 14, said arm being bent so as to project under the shutter 72 whereby the scale arm may be balanced when said shutter is lowered, shutting off the view of the scale arm when the point of the arrow 171 alines with the arrow point 172 the scales will be nicely balanced.

The operation of the machine is as follows:—After the machine has been operated it leaves the shutter 72 in a raised position, the plunger 52 being shoved into the case 4 as far as possible, and the member 133 holding the crank lever 132 in such a position that the rod 131 is held rotated and the bifurcated lever 136 is holding the clutch member 86 out of engagement with the clutch member 82 whereby the knob 85 may be freely rotated without having any effect whatsoever on the operation of the machine. To operate the machine it is necessary to drop a coin into the slot 15 which drops into the receptacle 19 overbalancing the arm 20 which through the link 28 trips the latch 32 from engagement with the bell crank 34 whereby said crank will trip the dog 49 releasing the plunger 52, thus permitting the spring 53 to force said plunger outwardly, thereby freeing the crank lever 132 and permitting the spring 91 to force the clutch member 86 into frictional engagement with the clutch member 82 whereby the sprocket shaft 81 may be operated by rotating the knob 85, thus permitting the movement of the poise operating member 101 on the bars 102 and 103, so that the scale with its weight may be balanced, this being accomplished while the shutter 72 is in its lowered position hiding the scale beam 10 from view. As soon as the beam is nicely balanced, which may be determined as previously explained, the person being weighed then pushes in the plunger 52, the roller 63 thereon operating against the lever 58 operates the rod 57 causing the lever 61 to draw on the link 77 and raise the shutter 72 thus again exposing the scale beam and the poise whereby the weight may be ascertained. The pushing in of the plunger 52 causes the arm 59 through the link 65 to set the bell crank 34 releasing the lever 49 permitting it to engage with the recesses 51 in the plunger 52 thereby holding the plunger in an inward position and the member 133 holding the crank lever 134 in such position that the bifurcated lever 136 on the rod 131 holds the clutch member 86 out of engagement with the clutch member 82 whereby the machine is again in a set position to receive the next coin.

While the poise operating device described in the above specification is essential in order that this weighing machine will properly and correctly weigh, still the same poise operating mechanism is adapted for use in combination with many other weighing machines.

Having now described our invention that which we claim to be new and desire to procure by Letters Patent is:—

1. In a coin controlled machine having a vertical rotatable rod, a vertically movable shutter adapted to be operated by said rod, an inclined link loosely connected to said shutter and shaft by means of which said shutter is drawn to a vertically raised position, inclined hangers upon which said shutter is mounted, straps adapted to hold said hangers against horizontal movement, a lever on said rod by means of which it is rotated, a plunger having means thereon adapted to actuate said lever, a spring connected to said plunger whereby it is held in a normal outwardly projecting position, the weight of said shutter drawing upon said link being adapted to hold said rod in a normal position, and a spring actuated dog adapted to engage said plunger when in a pushed in position and thereby hold said rod in a rotated position and hold said shutter in a raised position.

2. In a coin controlled machine having a vertical rotatable rod, a vertically movable shutter adapted to be operated by said rod, an inclined link loosely connected to said shutter and shaft by means of which said shutter is drawn to a vertically raised position, inclined hangers upon which said shutter is mounted, straps adapted to hold said hangers against horizontal movement, a lever on said rod by means of which it is rotated, a plunger having means thereon adapted to actuate said lever, a spring connected to said plunger whereby it is held in a normal outwardly projecting position, the weight of said shutter drawing upon said link being adapted to hold said rod in a normal position, a spring actuated dog adapted to engage said plunger when in a pushed in position and thereby hold said rod in a rotated position and hold said shutter in a raised position, and a bell crank adapted to trip said dog whereby said plunger is released.

3. In a coin controlled machine having a vertical rotatable rod, a vertically movable shutter adapted to be operated by said rod, an inclined link loosely connected to said shutter and shaft by means of which said shutter is drawn to a vertically raised position, inclined hangers upon which said shutter is mounted, straps adapted to hold said hangers against horizontal movement, a lever on said rod by means of which it is rotated, a plunger having means thereon adapted to actuate said lever, a spring connected to said plunger whereby it is held in a normal outwardly projecting position, the weight of said shutter drawing upon said link being adapted to hold said rod in a normal position, a spring actuated dog adapted to engage said plunger when in a pushed in position and thereby hold said rod in a rotated position and hold said shutter in a raised position, a bell crank adapted to trip said dog whereby said plunger is released, and a vertically operating latch adapted to hold said bell crank out of engagement with said dog.

4. In a coin controlled machine having a vertical rotatable rod, a vertically movable shutter adapted to be operated by said rod, an inclined link loosely connected to said shutter and shaft by means of which said shutter is drawn to a vertically raised position, inclined hangers upon which said shutter is mounted, straps adapted to hold said hangers against horizontal movement, a lever on said rod by means of which it is rotated, a plunger having means thereon adapted to actuate said lever, a spring connected to said plunger whereby it is held in a normal outwardly projecting position, the weight of said shutter drawing upon said link being adapted to hold said rod in a normal position, a spring actuated dog adapted to engage said plunger when in a pushed in position and thereby hold said rod in a rotated position and hold said shutter in a raised position, a bell-crank adapted to trip said dog whereby said plunger is released, a vertically operating latch adapted to hold said bell-crank out of engagement with said dog, and a spring adapted to actuate said latch to hold it in a normally raised position.

5. In a coin controlled machine having a vertical rotatable rod, a vertically movable shutter adapted to be operated by said rod, an inclined link loosely connected to said shutter and shaft by means of which said shutter is drawn to a vertically raised position, inclined hangers upon which said shutter is mounted, straps adapted to hold said hangers against horizontal movement, a lever on said rod by means of which it is rotated, a plunger having means thereon adapted to actuate said lever, a spring connected to said plunger whereby it is held in a normal outwardly projecting position, the weight of said shutter drawing upon said link being adapted to hold said rod in a normal position, a spring actuated dog adapted to engage said plunger when in a pushed in position and thereby hold said rod in a rotated position and hold said shutter in a raised position, a bell crank adapted to trip said dog whereby said plunger is released, a vertically operating latch adapted to hold said bell crank out of engagement with said dog, and a spring adapted to actuate said latch to hold it in a normally raised position, said bell-crank being spring actuated whereby it will engage and actuate said dog.

6. In a coin controlled machine having a vertical rotatable rod, a vertically movable shutter adapted to be operated by said rod, an inclined link loosely connected to said shutter and shaft by means of which said shutter is drawn to a vertically raised position, inclined hangers upon which said shutter is mounted, straps adapted to hold said hangers against horizontal movement, a lever on said rod by means of which it is rotated, a plunger having means thereon adapted to actuate said lever, a spring connected to said plunger whereby it is held in a normal outwardly projecting position, the weight of said shutter drawing upon said link being adapted to hold said rod in a normal position, a spring actuated dog adapted to engage said plunger when in a pushed in position and thereby hold said rod in a rotated position and hold said shutter in a raised position, a bell crank adapted to trip said dog whereby said plunger is released, a vertically operating latch adapted to hold said bell crank out of engagement with said dog, a spring adapted to actuate said latch to hold it in a normally raised position, said bell crank being spring actuated whereby it will engage and actuate said dog, a lever on said rod, a link having a slot in its free end connected to said last lever, and a pin projecting through said slot and into said bell crank whereby the rotation of said rod to a normal position will cause said link to draw said bell crank into locked engagement with said latch.

7. In a coin controlled machine having a vertical rotatable rod, a vertically movable shutter adapted to be operated by said rod, an inclined link loosely connected to said shutter and shaft by means of which said shutter is drawn to a vertically raised position, inclined hangers upon which said shutter is mounted, straps adapted to hold said hangers against horizontal movement, a lever on said rod by means of which it is rotated, a plunger having means thereon adapted to actuate said lever, a spring connected to said plunger whereby it is held in a normal outwardly projecting position, the weight of said shutter drawing upon said link being adapted to hold said rod in a normal position, a spring actuated dog adapted to engage said plunger when in a pushed in position and thereby holding said rod in a rotated position and hold said shutter in a raised position, a bell crank adapted to trip said dog whereby said plunger is released, a vertically operating latch adapted to hold said bell crank out of engagement with said dog, a spring adapted to actuate said latch to hold it in a normally raised position, said bell crank being spring actuated whereby it will engage and actuate said dog, a lever on said rod, a link having a slot in its free end connected to said last lever, a pin projecting through said slot and into said bell crank whereby the rotation of said rod to a normal position will cause said link to draw said bell crank into locked engagement with said latch, and a coin operating balance arm adapted to disengage said latch from said bell crank.

8. In a coin-controlled machine, a shutter, a vertical rotatable rod adapted to actuate said shutter, means for rotating said rod, said means consisting of a lever, means for operating said lever, said last means consisting of a spring-controlled plunger, a dog adapted to hold said plunger against the action of its spring, and means for releasing said dog from said plunger.

9. In a coin-controlled machine, a vertically movable shutter, a vertical rotatable rod by means of which said shutter is operated, means whereby the movement of said shutter in one direction may be prevented and coin controlled means for controlling said last means.

10. In a coin-controlled machine, a shutter, a vertical rotatable rod adapted to actuate said shutter, a plunger for actuating said rod, said shutter adapted to hide a scale beam, a dog adapted to hold said plunger in a locked position, said dog being spring controlled, means for disconnecting said dog from said plunger, said last means consisting of a bell crank, said crank being spring actuated, a link connecting said crank and rod, a lever on said rod to which said link is connected, a catch for controlling said link, said catch being spring controlled, a lever for actuating said catch, a balance rod for operating said lever, and means for holding said balance rod overbalanced.

11. In a coin-controlled machine, a vertically and horizontally movable shutter, a rotatable rod whereby said shutter may be operated, a lever on said rod by means of which the rod is rotated, a plunger having means adapted to actuate said lever, a spring adapted to control said plunger, and means for holding said rod in a rotated position, said means consisting of a dog, said dog being spring-actuated.

12. In a coin-controlled machine, a vertical movable shutter, a vertical rotatable rod by means of which said shutter is operated, a spring-controlled dog adapted to prevent the movement of said shutter in one direction, means for actuating said dog, a coin-controlled latch for controlling said dog, a balance whereby said latch is actuated, a normally locked spring-controlled plunger whereby said rod may be actuated, said dog adapted to release said plunger for operation, pivotally mounted arms upon which said shutter is mounted, and a lever on said rod connected with said shutter.

13. In a coin-controlled machine, a shutter, a vertical rotatable rod adapted to actuate said shutter, means for rotating said rod, said means consisting of a lever, means for operating said lever, said last means consisting of a spring-controlled plunger, a dog adapted to hold said plunger against the action of its spring, and means for releasing said dog from said plunger, said last means consisting of a bell crank.

14. In a coin-controlled machine, a shutter, a vertical rotatable rod adapted to actuate said shutter, a lever for rotating said rod, means for operating said lever, consisting of a spring-controlled plunger, a dog adapted to hold said plunger against the action of its spring, and means for releasing said dog from said plunger, a link connecting said rod and shutter, and inclined arms upon which said shutter is swung.

15. In a coin-controlled machine, a shutter, a vertical rotatable rod adapted to actuate said shutter, said shutter adapted to rotate said rod, means for holding said rod in a normal position, said first means consisting of a plunger, said shutter adapted to hide a scale beam, a dog adapted to hold said plunger in a locked position, said dog being spring-controlled, means for disconnecting said dog from said plunger, said last means consisting of a bell crank, said crank being spring-actuated.

16. In a coin-controlled machine, a vertical movable shutter, a vertical rotatable rod by means of which said shutter is operated, a spring-controlled dog adapted to prevent the movement of said shutter in one direction, means for actuating said dog, a coin-controlled latch for controlling said dog, a balance whereby said latch is operated, a normally locked spring-controlled plunger whereby said rod may be actuated, said dog adapted to release said plunger.

17. In a coin-controlled machine, a vertically and horizontally movable shutter, a rotatable rod, a lever on said rod by means of which the rod is rotated, a plunger having means adapted to actuate said lever, and a spring adapted to control said plunger, means for holding said rod in a rotated position, said means consisting of a dog.

18. In a coin-controlled machine, a shutter, a vertical rotatable rod adapted to actuate said shutter, a plunger for actuating said rod, a dog adapted to hold said plunger in a locked position, said dog being spring-controlled, means for releasing said dog from said plunger, said last means consisting of a bell crank, said crank being spring-actuated, a link connecting said crank and rod, a lever on said rod to which said link is connected, and a catch for controlling said link, said catch being spring-controlled, a lever for actuating said catch, and a balance rod for operating said lever.

19. In a coin-controlled machine, a shutter, a vertical rotatable rod adapted to actuate said shutter, a lever for rotating said rod, means for operating said lever, said means consisting of a spring-controlled plunger, a dog adapted to hold said plunger against the action of its spring, and means for releasing said dog from said plunger.

20. In a coin-controlled machine, a shutter, a vertical rotatable rod adapted to actuate said shutter, means for rotating said rod, said shutter adapted to rotate said rod, and hold it in a normal position, said first means consisting of a plunger, a dog adapted to hold said plunger in a locked position, said dog being spring controlled, means for releasing said dog from said plunger, said last means consisting of a bell crank, said crank being spring-actuated, and a pivotally mounted base upon which said crank is mounted.

21. In a coin-controlled machine, a vertically and horizontally movable shutter, means whereby said shutter may be operated, said means consisting of a rotatable rod, a lever on said rod by means of which the rod is rotated, a plunger having means adapted to actuate said lever, and a spring adapted to control said plunger, means for holding said rod in a rotated position, said means consisting of a dog, said dog being spring actuated, said plunger having a serrated side for engagement with said dog.

22. In a coin-controlled machine, a shutter, a vertical rotatable rod adapted to actuate said shutter, said shutter adapted to hold said rod in a normal position, a plunger for rotating said rod, a dog adapted to hold said plunger in a locked position, said dog being spring-controlled, and means for disconnecting said dog from said plunger, said last means consisting of a bell crank, said bell crank being spring-actuated, a link connecting said crank rod, a lever on said rod to which said link is connected, a catch for controlling said link, said catch being spring-controlled, a lever for actuating said catch, a balance rod for operating said lever, and means for holding said balance rod overbalanced, and a coin receptacle on said balance rod, said receptacle adapted to discharge a coin therefrom, said plunger adapted to control a poise-operating device.

23. In a coin-controlled machine, a shutter, a vertical rotatable rod adapted to actuate said shutter, a lever for rotating said rod, a spring-controlled plunger for operating said lever, a dog adapted to hold said plunger against the action of its spring, means for releasing said dog from said plunger, said means consisting of a bell crank, a spring adapted to operate said crank, a latch adapted to hold said crank, means for releasing said latch consisting of a coin-controlled balance rod, a link for connecting said balance rod and latch, a link connecting said crank and said rod, whereby said crank may be brought under control of said latch, and a lever on said rod to operate said link.

24. In a coin-controlled machine, a shutter, a rod adapted to actuate said shutter, a lever on said rod, means for operating said lever to rotate said rod, said means consisting of a spring-controlled plunger, a dog adapted to hold said plunger against the action of its spring, means for releasing said dog from said plunger, said last means consisting of a bell-crank, a spring adapted to operate said crank, a latch adapted to hold said crank in a fixed position, and means for releasing said latch from said crank, said means consisting of a coin-controlled balance rod, a link for connecting said balance rod and latch, and a link connecting said crank and said rod.

25. In a coin-controlled machine, a shutter, a vertical rotatable rod adapted to actuate said shutter, said shutter adapted to hold said rod in a normal position, a plunger adapted to rotate said rod, a dog adapted to hold said plunger in a locked position, said dog being spring-controlled, means for releasing said dog from said plunger, consisting of a bell crank, said crank being spring-actuated, a link connecting said crank and rod, a lever on said rod to which said link is connected, a catch for controlling said crank, said catch being spring-controlled, a lever for actuating said catch, a balance rod for operating said last lever, means for holding said balance rod overbalanced, and a coin receptacle on said balance rod.

26. In a coin-controlled machine, a vertically and horizontally movable shutter, a rotatable rod whereby said shutter may be operated, a lever on said rod, by means of which the rod is rotated, a plunger having means adapted to actuate said lever, and a spring adapted to control said plunger, means for holding said rod in a rotated position, said means consisting of a dog, said dog being spring-actuated, said plunger having a serrated side for engagement with said dog, and means for releasing said dog from engagement with said plunger.

27. The described device consisting of a casing, a vertically and horizontally movable shutter, coin-controlled means whereby said shutter may be controlled, said means embracing a vertical rod, said rod being rotatable, a link connecting said shutter and rod, a lever on said rod connected to said link, said coin-controlled means consisting of a spring controlled dog, means whereby said dog may be actuated against the tension of said spring, and means for controlling said dog actuating means.

28. The described device consisting of a casing, a vertically and horizontally movable shutter, coin-controlled means whereby said shutter may be controlled, said means embracing a vertical rod, said rod being rotatable, a link connecting said shutter and rod, a lever on said rod connected to said link, said coin-controlled means consisting of a spring controlled dog, means whereby said dog may be actuated against the tension of said spring, means for controlling said dog actuating means, said last means consisting of a spring, and means for actuating said dog actuating means.

29. The described device consisting of a casing, a vertically and horizontally movable shutter, coin-controlled means whereby said shutter may be controlled, said means embracing a vertical rod, said rod being rotatable, a link connecting said shutter and rod, a lever on said rod connected to said link, said coin-controlled means consisting of a spring controlled dog, means whereby said dog may be actuated against the tension of said spring, means for controlling said dog actuating means, said last means consisting of a spring, and means for actuating said dog actuating means, said last means consisting of a link connected to said rod.

30. The described device consisting of a casing, a vertically and horizontally movable shutter, coin-controlled means whereby said shutter may be controlled, said means embracing a vertical rod, said rod being rotatable, a link connecting said shutter and rod, a lever on said rod connected to said link, said coin-controlled means consisting of a spring controlled dog, means whereby said dog may be actuated against the tension of said spring, means for controlling said dog actuating means, said last means consisting of a spring, means for actuating said dog actuating means, said last means consisting of a link connected to said rod, and a lever on said rod forming said connection.

31. The described device consisting of a casing, a vertically and horizontally movable shutter, coin-controlled means whereby said shutter may be controlled, said means embracing a vertical rod, said rod being rotatable, a link connecting said shutter and rod, a lever on said rod connected to said link, said coin-controlled means consisting of a spring controlled dog, means whereby said dog may be actuated against the tension of said spring, means for controlling said dog actuating means, said last means consisting of a spring, means for actuating said dog actuating means, said last means consisting of a link connected to said rod, a lever on said rod forming said connection, and a catch for holding said dog actuating means.

32. The described device consisting of a casing, a vertically and horizontally movable shutter, coin-controlled means whereby said shutter may be controlled, said means embracing a vertical rod, said rod being rotatable, a link connecting said shutter and rod, a lever on said rod connected to said link, said coin-controlled means consisting of a spring controlled dog, means whereby said dog may be actuated against the tension of said spring, means for controlling said dog actuating means, said last means consisting of a spring, means for actuating said dog actuating means, said last means consisting of a link connected to said rod, a lever on said rod forming said connection, a catch for holding said dog actuating means, and a balance lever adapted to trip said catch.

33. The described device consisting of a casing, a vertically and horizontally movable shutter, coin-controlled means whereby said shutter may be controlled, said means embracing a vertical rod, said rod being rotatable, a link connecting said shutter and rod, a lever on said rod connected to said link, said coin-controlled means consisting of a spring controlled dog, means whereby said dog may be actuated against the tension of said spring, means for controlling said dog actuating means, said last means consisting of a spring, means for actuating said dog actuating means, said last means consisting of a link connected to said rod, a lever on said rod forming said connection, a catch for holding said dog actuating means, and a balance lever adapted to trip said catch, said catch being spring controlled.

34. The described device consisting of a casing, a vertically and horizontally movable shutter, coin-controlled means whereby said shutter may be controlled, said means embracing a vertical rod, said rod being rotatable, a link connecting said shutter and rod, a lever on said rod connected to said link, said coin-controlled means consisting of a spring controlled dog, means whereby said dog may be actuated against the tension of said spring, means for controlling said dog actuating means, said last means consisting of a spring, means for actuating said dog actuating means, said last means consisting of a link connected to said rod, a lever on said rod forming said connection, a catch for holding said dog actuating means, a balance lever adapted to trip said catch, said catch being spring controlled, and a pocket on one end of said lever to receive a coin.

35. The described device consisting of a casing, a vertically and horizontally movable shutter, coin-controlled means whereby said shutter may be controlled, said means embracing a vertical rod, said rod being rotatable, a link connecting said shutter and rod, a lever on said rod connected to said link, said coin-controlled means consisting of a spring controlled dog, means whereby said dog may be actuated against the tension of said spring, means for controlling said dog actuating means, said last means consisting of a spring, means for actuating said dog actuating means, said last means consisting of a link connected to said rod, a lever on said rod forming said connection, a catch for holding said dog actuating means, a balance lever adapted to trip said catch, said catch being spring controlled, and a pocket on one end of said lever to receive a coin, whereby said lever is overbalanced.

36. The described device consisting of a casing, a vertically and horizontally movable shutter, coin-controlled means whereby said shutter may be controlled, said means consisting of a vertical rotatable rod, means connecting said shutter and rod, a plunger, means connecting said rod and plunger, and a dog for controlling said plunger.

37. The described device consisting of a casing, a vertically and horizontally movable shutter, coin-controlled means whereby said shutter may be controlled, said means consisting of a vertical rotatable rod, means connecting said shutter and rod, a plunger, means connecting said rod and plunger, a dog for controlling said plunger, a spring for controlling said dog, and a bell crank for operating said dog.

38. The described device consisting of a casing, a vertically and horizontally movable shutter, coin-controlled means whereby said shutter may be controlled, said means consisting of a vertical rotatable rod, means connecting said shutter and rod, a plunger, means connecting said rod and plunger, a dog for controlling said plunger, a spring for controlling said dog, a bell crank for operating said dog, a spring for controlling said bell crank, and means for operating said bell crank.

39. The described device consisting of a casing, a vertically and horizontally movable shutter, coin-controlled means whereby said shutter may be controlled, said means consisting of a vertical rotatable rod, means connecting said shutter and rod, a plunger, means connecting said rod and plunger, a dog for controlling said plunger, a spring for controlling said dog, a bell crank for operating said dog, a spring for controlling said bell crank, means for operating said bell crank, and means for locking said bell crank.

40. The described device consisting of a casing, a vertically and horizontally movable shutter, coin-controlled means whereby said shutter may be controlled, said means consisting of a vertical rotatable rod, means connecting said shutter and rod, a plunger, means connecting said rod and plunger, a dog for controlling said plunger, a spring for controlling said dog, a bell crank for operating said dog, a spring for controlling said bell crank, means for operating said bell crank, means for locking said bell crank, and means for tripping said lock.

41. The described device consisting of a casing, a vertically and horizontally movable shutter, coin-controlled means whereby said shutter may be controlled, said means consisting of a vertical rotatable rod, means connecting said shutter and rod, a plunger, means connecting said rod and plunger, a dog for controlling said plunger, a spring for controlling said dog, a bell crank for operating said dog, a spring for controlling said bell crank, means for operating said bell crank, means for locking said bell crank, means for tripping said lock, and means for actuating said trip.

42. The described device consisting of a casing, a vertically and horizontally movable shutter, coin-controlled means whereby said shutter may be controlled, said means consisting of a vertical rotatable rod, means connecting said shutter and rod, a plunger, means connecting said rod and plunger, a dog for controlling said plunger, a spring for controlling said dog, a bell crank for operating said dog, a spring for controlling said bell crank, means for operating said bell crank, means for locking said bell crank, means for tripping said lock, and means for actuating said trip, said means consisting of a lever.

43. The described device consisting of a casing, a vertically and horizontally movable shutter, coin-controlled means whereby said shutter may be controlled, said means consisting of a vertical rotatable rod, means connecting said shutter and rod, a plunger, means connecting said rod and plunger, a dog for controlling said plunger, a spring for controlling said dog, a bell crank for operating said dog, a spring for controlling said bell crank, means for operating said bell crank, means for locking said bell crank, means for tripping said lock, and means for actuating said trip, said means consisting of a lever, said lever being a balance lever.

44. The described device consisting of a casing, a vertically and horizontally movable shutter, coin-controlled means whereby said shutter may be controlled, said means consisting of a vertical rotatable rod, means connecting said shutter and rod, a plunger, means connecting said rod and plunger, a dog for controlling said plunger, a spring for controlling said dog, a bell crank for operating said dog, a spring for controlling said bell crank, means for operating said bell crank, means for locking said bell crank, means for tripping said lock, and means for actuating said trip, said means consisting of a lever, said lever being a balance lever and coin controlled.

45. The described device consisting of a casing, a vertically and horizontally movable shutter, coin-controlled means whereby said shutter may be controlled, said means consisting of a vertical rotatable rod, means connecting said shutter and rod, a plunger, means connecting said rod and plunger, a dog for controlling said plunger, a spring for controlling said dog, a bell crank for operating said dog, a spring for controlling said bell crank, and means for operating said bell crank, said means consisting of a link operated by said rod.

46. The described device consisting of a casing, a vertically and horizontally movable shutter, coin-controlled means whereby said shutter may be controlled, said means consisting of a vertical rotatable rod, means connecting said shutter and rod, a plunger, means connecting said rod and plunger, a dog for controlling said plunger, a spring for controlling said dog, a bell crank for operating said dog, a spring for controlling said bell crank, and means for operating said bell crank, said means consisting of a link operated by said rod, said link having a loose connection with said bell crank, whereby it will move said bell crank in one direction only.

47. The described device consisting of a casing, a vertically and horizontally movable shutter, coin-controlled means whereby said shutter may be controlled, said means consisting of a vertical rotatable rod, means connecting said shutter and rod, a plunger, means connecting said rod and plunger, a dog for controlling said plunger, a spring for controlling said dog, and means for operating said dog.

48. The described device consisting of a casing having a base, a plunger slidable upon said base, a vertical rotatable rod adapted to be actuated by said plunger, means for locking said plunger against movement, said means consisting of a spring-controlled dog, and a horizontal movable bell-crank adapted to control said dog, and a spring for normally controlling said bell crank.

49. The described device consisting of a casing having a base, a plunger slidable upon said base, a vertical rotatable rod adapted to be actuated by said plunger, means for locking said plunger against movement, said means consisting of a spring-controlled dog, a horizontal bell-crank adapted to control said dog, and a spring for normally controlling said bell crank, and means for moving said bell crank against the action of its spring.

50. The described device consisting of a casing, having a base, a plunger slidable upon said base, a vertical rotatable rod adapted to be actuated by said plunger, means for locking said plunger against movement, said means consisting of a spring-controlled dog, a horizontal bell-crank adapted to control said dog, a spring for normally controlling said bell crank, and means for moving said bell crank against the action of its spring, said means consisting of a link connecting said bell crank to said rod.

51. The described device consisting of a casing having a base, a plunger slidable upon said base, a vertical rotatable rod adapted to be actuated by said plunger, means for locking said plunger against movement, said means consisting of a spring-controlled dog, a horizontal bell-crank adapted to control said dog, a spring for normally controlling said bell crank, means for moving said bell crank against the action of its spring, said means consisting of a link connecting said bell crank to said rod, and a catch for holding said bell crank against the action of its spring.

52. The described device consisting of a casing having a base, a plunger slidable upon said base, a vertical rotatable rod adapted to be actuated by said plunger, means for locking said plunger against movement, said means consisting of a spring-controlled dog, a horizontal bell-crank adapted to control said dog, a spring for normally controlling said bell crank, means for moving said bell crank against the action of its spring, said means consisting of a link connecting said bell crank to said rod, a catch for holding said bell crank against the action of its spring, and means for holding said catch in a normally raised position.

53. The described device consisting of a casing having a base, a plunger slidable upon said base, a vertical rotatable rod adapted to be actuated by said plunger, means for locking said plunger against movement, said means consisting of a spring-controlled dog, a horizontal bell-crank adapted to control said dog, a spring for normally controlling said bell crank, means for moving said bell crank against the action of its spring, said means consisting of a link connecting said bell crank to said rod, a catch for holding said bell crank against the action of its spring, and means for holding said catch in a normally raised position, and means for lowering said catch to release said bell crank.

54. The described device consisting of a casing having a base, a plunger slidable upon said base, a vertical rotatable rod adapted to be actuated by said plunger, means for locking said plunger against movement, said means consisting of a spring-controlled dog, a horizontal bell-crank adapted to control said dog, a spring for normally controlling said bell crank, means for moving said bell crank against the action of its spring, said means consisting of a link connecting said bell crank to said rod, a catch for holding said bell crank against the action of its spring, and means for holding said catch in a normally raised position, and means for lowering said catch to release said bell crank, said last means consisting of a balance.

55. The described device consisting of a casing having a base, a plunger slidable upon said base, a vertical rotatable rod adapted to be actuated by said plunger, means for locking said plunger against movement, said means consisting of a spring-controlled dog, a horizontal bell-crank adapted to control said dog, a spring for normally controlling said bell crank, means for moving said bell crank against the action of its spring, said means consisting of a link connecting said bell crank to said rod, a catch for holding said bell crank against the action of its spring, and means for holding said catch in a normally raised position, and means for lowering said catch to release said bell crank, said last means consisting of a balance, said balance being coin-controlled.

56. The described device consisting of a casing having a base, a plunger slidable upon said base, a vertical rotatable rod adapted to be actuated by said plunger, means for locking said plunger against movement, said means consisting of a spring-controlled dog, a horizontal bell-crank adapted to control said dog, a spring for normally controlling said bell crank, means for moving said bell crank against the action of its spring, said means consisting of a link connecting said bell crank to said rod, a catch for holding said bell crank against the action of its spring, means for holding said catch in a normally raised position, means for lowering said catch to release said bell crank, said last means consisting of a balance, said balance being coin-controlled, and a link connecting said balance and latch.

57. The described device consisting of a casing having a base, a plunger slidable upon said base, a vertical rotatable rod adapted to be actuated by said plunger, means for locking said plunger against movement, said means consisting of a spring-controlled dog, a horizontal bell-crank adapted to control said dog, a spring for normally controlling said bell crank, means for moving said bell crank against the action of its spring, said means consisting of a link connecting said bell crank to said rod, a catch for holding said bell crank against the action of its spring, means for holding said catch in a normally raised position, means for lowering said catch to release said bell crank, said last means consisting of a balance, said balance being coin-controlled, and a vertically and horizontally movable shutter operated by said rod.

58. The described device consisting of a casing, a plunger slidable therein, a rotatable rod adapted to be actuated by said plunger, a spring controlled dog adapted to engage and lock said plunger against movement and coin controlled means for releasing said dog.

In testimony whereof we affix our signatures in the presence of two witnesses.

DE FOREST CURTIS WILLIAMS.
WILLIAM MARSH UPDEGRAVE.

Witnesses:
W. A. FISHER,
MARTHA M. CHURCH.

Copies of this patent may be obtained for five cents each, by addressing the "Commissioner of Patents, Washington, D. C."